Patented June 7, 1938

2,120,054

UNITED STATES PATENT OFFICE 2,120,054

THERMOPLASTIC ADHESIVE AND LAMINATED FABRIC COMPRISING SAME

Ralph M. Freydberg, New York, N. Y., assignor to Acme Backing Corporation, Brooklyn, N. Y., a corporation of New York No Drawing. Application March 17, 1937, Serial No. 131,411

3 Claims. (Cl. 106—22)

This invention relates to adhesives and more especially to laminated fabrics intersecured by thermoplastic adhesives.

In general, it is an object of the invention to provide a device of the character described which will efficiently perform the purposes for which it is intended, which is simple and economical of construction, which can be expeditiously, conveniently and safely manipulated, and which can be readily manufactured.

Another object of the invention is to provide an adhesive which may be used in laminating and coating fabrics and to give a flexible permanent stiffness to interlinings, fabrics and backings; which is not affected by moisture, normal temperatures, nor especially by the exposure to light; which is but slightly and desirably affected by temperatures at which clothes are usually washed; which is somewhat and desirably affected, temporarily, by temperatures which clothes attain during ironing; which gives such a permanent flexible stiffness to clothes that starch does not need to be used during washing; which is not undesirably affected by the usual dry cleaning fluids or procedures; which is adapted to impregnate fabrics without discoloring them; and which, if desired, may be given a color.

Other objects of the invention will in part be obvious and will in part appear hereinafter.

The invention accordingly comprises a product possessing the features, properties and the relation of components which will be exemplified in the product hereinafter described and the scope of the application of which will be indicated in the claims.

For a fuller understanding of the nature and objects of the invention, reference should be had to the following detailed description.

Attempts have been made heretofore to stiffen single layers of fabric and to laminate a plurality of fabric layers by the use of thermoplastic adhesives. Various adhesives have been used having various properties and for various purposes, depending upon the kind of final product desired. These stiffened and laminated fabrics have not been entirely satisfactory. For example, there has been one great drawback in that when they have been exposed to heat and/or to light, they have, after a time, become discolored. It is obvious that fabrics which discolor cannot be used for certain purposes. Thus, they have been most unsuitable for white collars, cuffs, and shirt fronts. The present invention provides an adhesive and a final laminated product with does not discolor when exposed to ordinary heat and/or light or the light of the sun.

The adhesive may be applied as a stiffener to a single layer of fabric or as an adhesive and stiffener between two layers, or it may be impregnated into one layer and used as an interlining between other layers to be joined to such other layers under the action of heat and pressure. The adhesive and product described herein withstands successive laundering, dry cleaning, and ironing processes.

The fabrics used should be such that the adhesive may be impregnated between and/or into the fibers of the fabric. In the case of an interlining, the cloth used may be heavy or light, depending upon the type of cloth with which the interlining is to be used. Cotton sheeting may be laminated with the adhesive about to be described.

The thermoplastic composition herein described is a derivative or a mixture of derivatives of acrylic acid. These derivatives may be polymerized. The derivatives of methacrylic acid have been found to be particularly suitable especially when they are polymerized, e. g., methyl methacrylate. A preferred formula is as follows:

Example

| | Parts by weight |
|---|---|
| Polymerized derivative of methacrylic acid | 100 |
| Dibutyl phthalate (or other plasticizer) | 10 |
| Chlorinated rubber | 10 to 40 |

The polymerized derivative of methacrylic acid which is sold under the trade name of "Lucite" has been found to be entirely satisfactory. The proportions listed above may be varied within rather wide limits, e. g. chlorinated rubber may be but one part by weight.

The above ingredients would be mixed by subjection to heat and stirring, that is, in a heated mixer which would produce a paste-like composition, applied hot to the fabric by calender rollers.

The dibutyl phthalate acts as a plasticizer and the chlorinated rubber as a negative catalyst. Other known plasticizers may be substituted in whole or in part for the dibutyl phthalate.

Compositions made in accordance with the above formulae and embodying the essential features thereof begin to soften at substantially 180° F., and firmly unite layers of fabric when subjected to a temperature of about 300° F. and pressure. They are insoluble in straight chain hydrocarbons, alcohols, ethers, naphtha, gasoline, benzine, or boiling water. They are soluble in aromatic hydrocarbons with small amounts of alcohols and in lower ketone and ester solvents.

It will be understood that when the composition is used on a lining or backing fabric, as specified, it firmly unites said lining or backing to other fabrics, when the same are subjected to pressure and heat at a temperature of about 300° F., which is about the usual temperature of laundering irons. The lining or backing is dry when subjected to the heat and pressure, and the composition is softened and made tacky by the heat so that it adheres to the other fabrics under pressure.

It is to be understood that it is not essential to the use of the composition that it can be applied to a lining or backing fabric, as it can be interposed directly between two or more layers of fabric to unite them and form a substantially unitary laminated fabric possessing the characteristics above mentioned.

A laminated fabric embodying the said composition and united thereby may be laundered and dry-cleaned without separation of the layers. The composition softens at the usual temperature of laundering fluids or at the boiling point of water, but retains its adhesive qualities and maintains the layers united. The water or washing fluids may pass through the laminated fabric thoroughly to cleanse the same, but when the wet or damp fabrics are subjected to heat and pressure, such as the action of an iron, as soon as the moisture is expelled the fabric regains its original appearance and characteristics above pointed out.

The compound may be colored by adding thereto mineral fillers or high strength organic colors. Of course, the addition of such fillers or colors may vary the viscosity of the compound, but they do not affect its permanent qualities.

Fabrics bonded together with the above adhesive hold their bonded condition at any temperature normally possible in a laundering process, but at normal ironing temperatures the bond is softened somewhat and in sufficient amount for the laminated fabric to obtain the benefit of the ironing.

By coating and/or impregnating a cloth of such character as to present a mesh readily capable of impregnation to permit the compound to flow into the interstices, the adhesive medium or compound is so thoroughly embedded in the fibers of the fabric and in the interstices that it is possible for the bond between the fabrics to be slightly loosened during the laundering process, without, however, causing the layers of fabric to become actually detached one from the other. This permits the laundering fluids to pass through the articles made from the laminated fabric during a washing or dry-cleaning process, thoroughly to cleanse the articles, and then, as above pointed out, when the articles are subjected to heat and pressure during an ironing operation, the bond is again tightly formed, restoring the fabric to its original appearance and characteristics.

Laminated fabrics adhesively secured by the above adhesive may be washed and dry-cleaned as many times as desired. They may be exposed to heat and/or to sunlight for an indefinite period without changing their color. They are flexibly stiff and most suitable for collars, cuffs, shirt bosoms, and the like. If the fabric is originally made without creases or wrinkles, it will not show creases or wrinkles even after many washings and ironings. Due to the normal stiffness of the laminated fabric, it is not necessary to use starch in the washing thereof.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and useful and desire to secure by Letters Patent is:

1. A thermoplastic adhesive for use in uniting fabrics comprising 100 parts of a polymerized derivative of methacrylic acid, 10 parts dibutyl phthalate, and 1 part chlorinated rubber.

2. A thermoplastic adhesive for use in uniting fabrics and having a melting point above 300° F. comprising 100 parts of a polymerized derivative of methacrylic acid, 10 parts dibutyl phathalate, and 1 part chlorinated rubber.

3. A medium for forming laminated fabrics, comprising a sheet of material impregnated with a thermoplastic adhesive which maintains its adhesive qualities at temperatures below 212° F., comprising 100 parts of a polymerized derivative of methacrylic acid, 10 parts dibutyl phthalate, and 1 part chlorinated rubber.

RALPH M. FREYDBERG.